United States Patent [19]
Overby

[11] 4,126,104
[45] Nov. 21, 1978

[54] PORTABLE ANIMAL SPRAYER

[76] Inventor: Vernon V. Overby, P.O. Box 428, Edwards, Miss. 39066

[21] Appl. No.: 704,041

[22] Filed: Jul. 8, 1976

[51] Int. Cl.² ............................................. A01K 29/00
[52] U.S. Cl. .................................................. 119/159
[58] Field of Search ................. 119/159, 156, 160, 82, 119/14.03, 27, 98, 99

[56] References Cited

U.S. PATENT DOCUMENTS

| | | | |
|---|---|---|---|
| 1,501,200 | 7/1924 | Campion | 119/159 |
| 2,542,280 | 2/1951 | Knapp | 119/159 |
| 2,595,781 | 5/1952 | Durham | 119/159 |
| 2,814,271 | 11/1957 | Black | 119/55 |
| 3,173,402 | 3/1965 | Cassel | 119/159 |
| 3,541,996 | 11/1970 | Brockelsby | 119/159 |
| 3,602,199 | 8/1971 | Diggs | 119/159 |
| 3,796,191 | 3/1974 | McIntire | 119/82 |

*Primary Examiner*—Louis G. Mancene
*Assistant Examiner*—Daniel J. Leach
*Attorney, Agent, or Firm*—Wigman & Cohen

[57] ABSTRACT

The portable animal sprayer disclosed herein is a completely self-contained portable animal sprayer. The weight of the animal entering the sprayer pressurizes the system that provides the spray and therefore no external energy source is used. A limiting means insures prudent application of spray liquid and an interlock system provides an ordered application of insecticide by allowing only one animal at a time to pass through the unit. Due to the portability of the animal sprayer, it can be towed to any location on the farm or elsewhere and be used to spray medications or dye markings on the animals.

9 Claims, 6 Drawing Figures

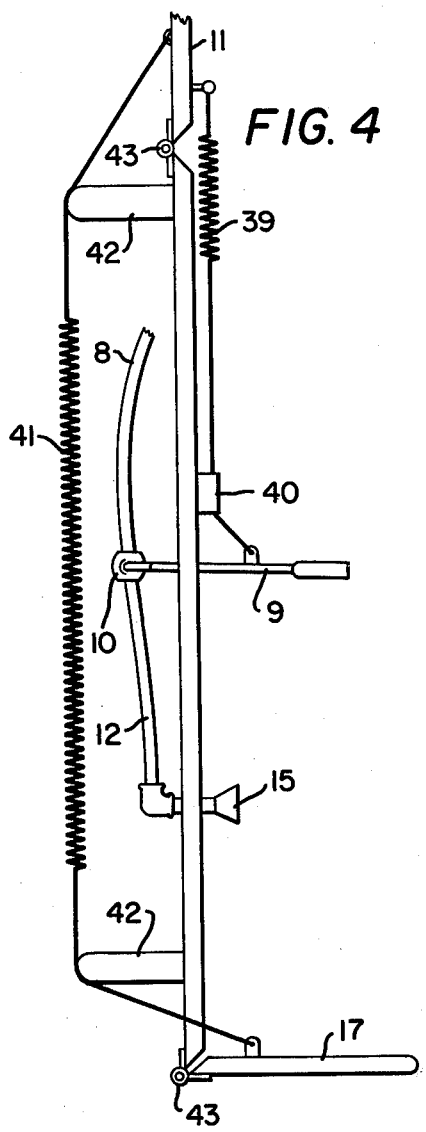
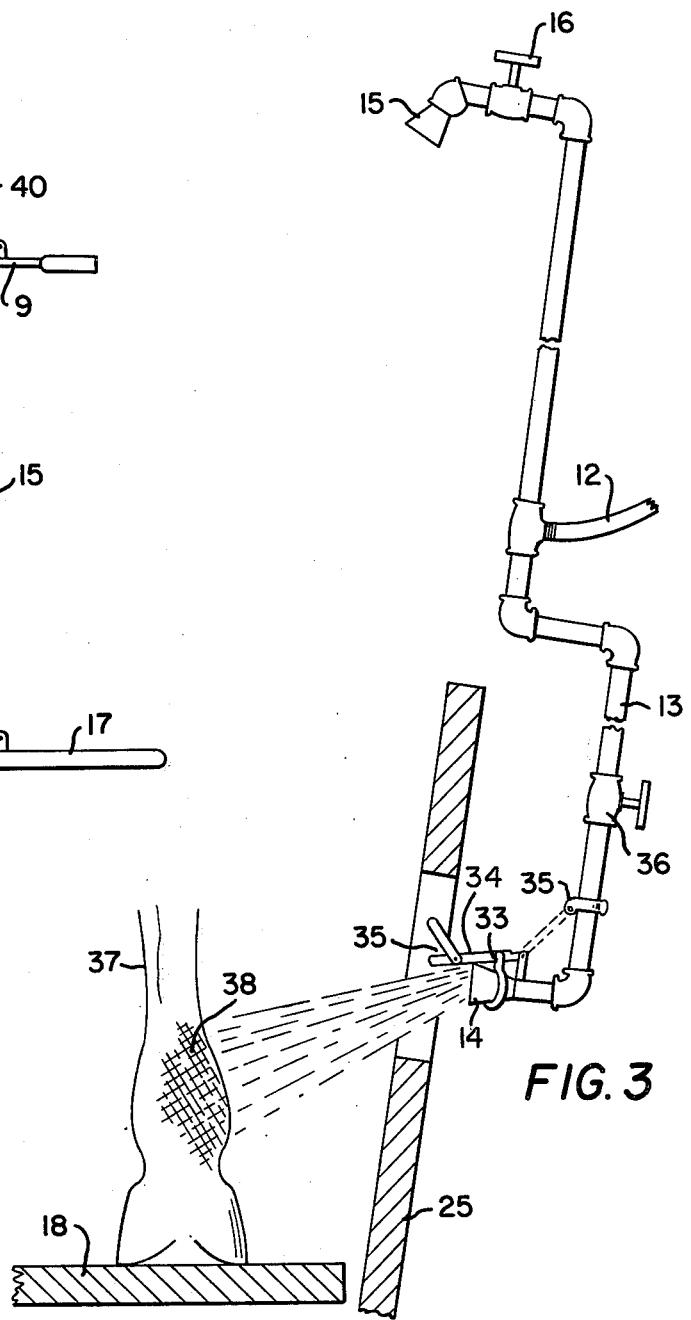

PORTABLE ANIMAL SPRAYER

The invention generally relates to cattle sprayers and more particularly to a completely portable, self-contained and self-energizing cattle spray unit.

An object of the invention is to provide a cattle sprayer and treatment unit which has complete mobility as a two-wheeled trailer and can be towed as a unit from either end.

An object of the invention is to provide a cattle sprayer which is totally self-contained, and which uses only the weight of the animal to power the unit.

Another object is to provide a cattle sprayer having an accumulator which insures a smooth and gentle spray, as well as stores sufficient energy in the form of pressure, from large animals such stored pressure energy insuring that adequate pressure is available for the spraying of smaller animals.

Another object of the invention is to provide a cattle sprayer unit which has complete stability during operation, by providing means for raising the wheels which are pivotably mounted to the frame, and thereby setting the unit full upon the ground.

Another object of the invention is the provision of a "V"-shaped passageway which insures the correct positioning of the animal during spraying, the unit being constructed with horizontal bars in the upper section, and solid plate construction for the lower sides and bottom.

Another object of the invention is to provide a cattle sprayer wherein return springs for the treadle and pressure piston are eliminated, thus requiring less animal force to operate the unit.

Still another object of the invention is to provide means for dispensing up to four medications at once, by the use of four separate storage tanks.

Another object of the invention is that the unit has the option of being used as a restraining pen.

Still another object of the invention is that the unit can be used to code or otherwise identify livestock.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 shows in isometric projection, the unit ready for use.

FIG. 2 is a diagrammatical side view illustrating how the cylinder pump compressor 2, co-acts with the entry ramp 1, storage tank 4, pressure accumulator 7, and the treadle 18.

FIG. 3 is a cross-sectional view illustrating how the unit may be adjusted to mark animals.

FIG. 4 is a top view depicting the principles of the unit's interlock system.

Figure 6:
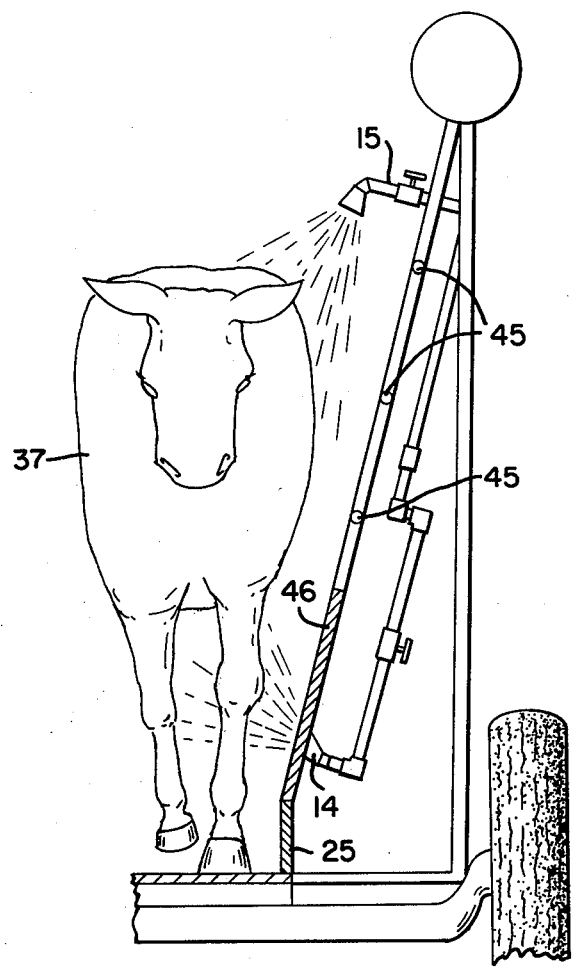

FIG. 6 is an end view of a cow 37 being sprayed by the upper spray heads 15, and the lower spray heads 14.

Referring specifically to the FIGS. 1 through 6, on arrival to a new site for the animals to be treated, the animal sprayer of the present invention is detached from the towing vehicle 47, at either trailer hitch exit end 31 or trailer hitch entrance end 32. A generally U-shaped axle 20 is pivotally mounted to the lower frame 26 and tires 23 are mounted at the end of each leg of the U-shaped axle. An axle lever 21 is secured to one leg of the axle and by rotating the same counterclockwise from the position shown in FIG. 5 to the position shown in FIG. 1, the tires 23 are raised to clear the ground insuring greater stability during operation. An axle lever lock pin 22 is provided for retaining the tires 23 in the raised position. Any suitable means may be provided for securing the axle lever 21 to the frame in the position shown in FIG. 5 and may be, for example, a coupling bolt arrangement as disclosed in U.S. Pat. No. 2,595,781. The entry ramp 1, and the exit ramp 19 are lowered into position at the chosen site such that the animals cannot get to their food or water without going through the unit and there is no problem getting the animals to do this.

Figure 1:
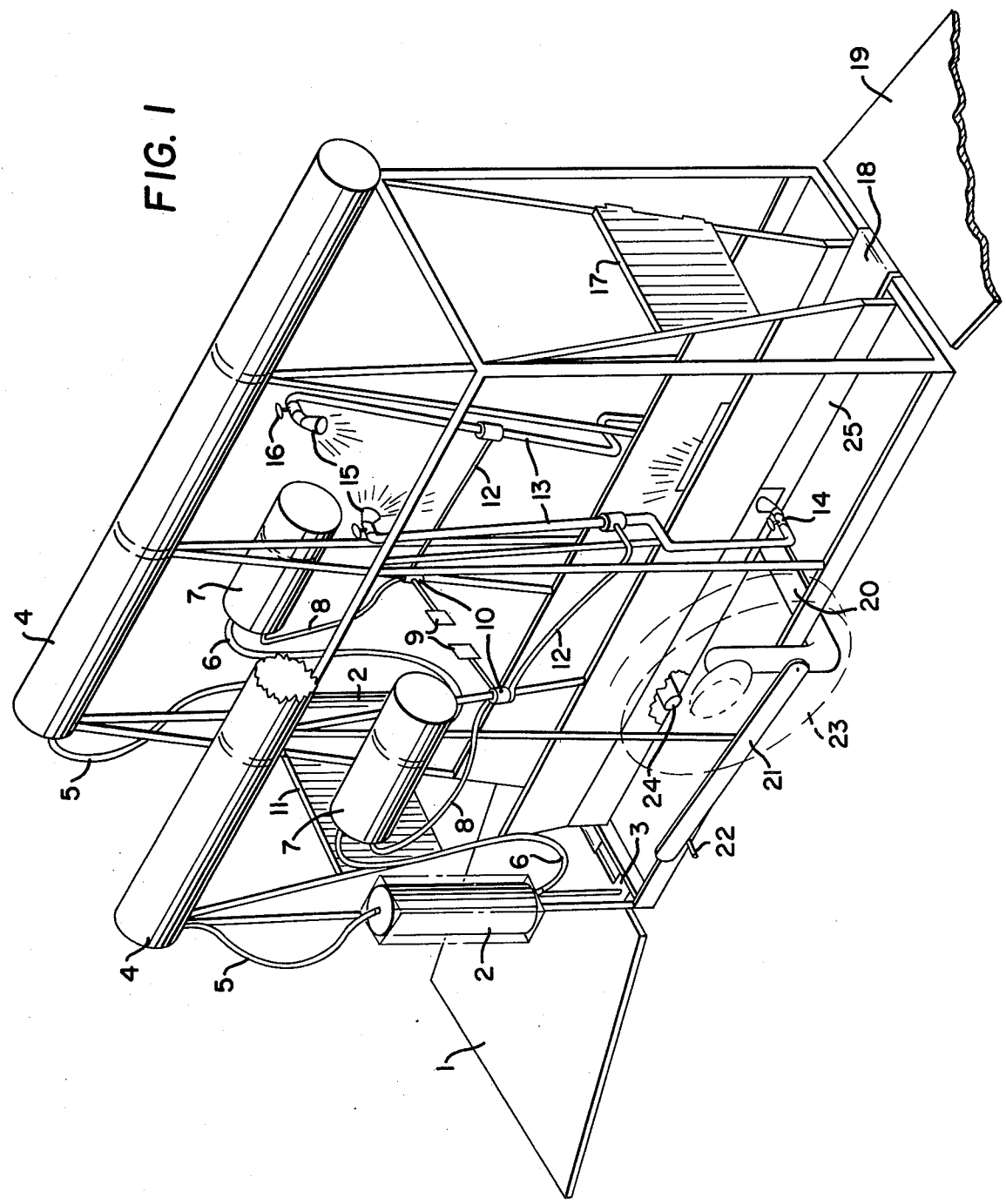
Figure 2:
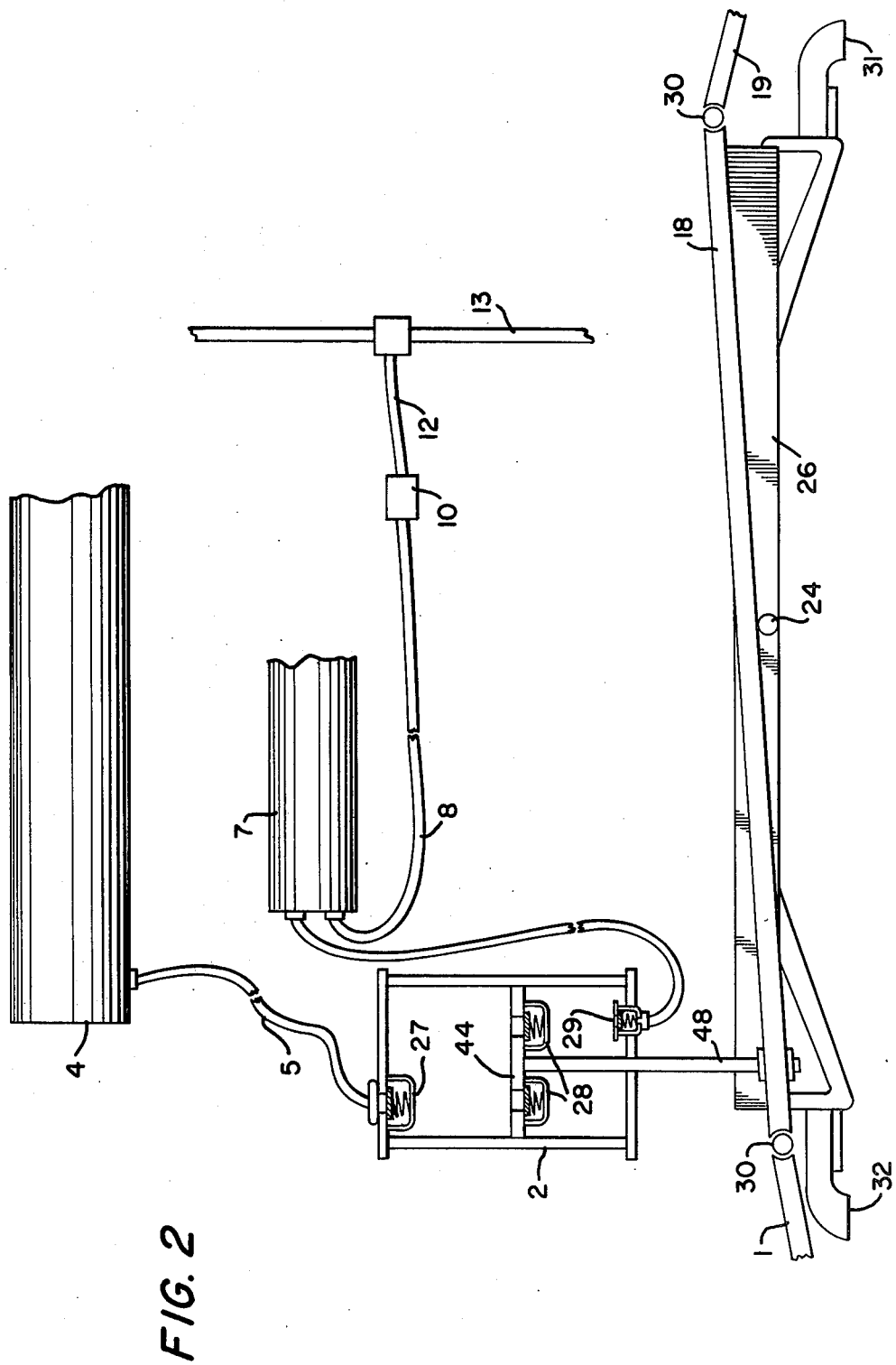
Figure 5:
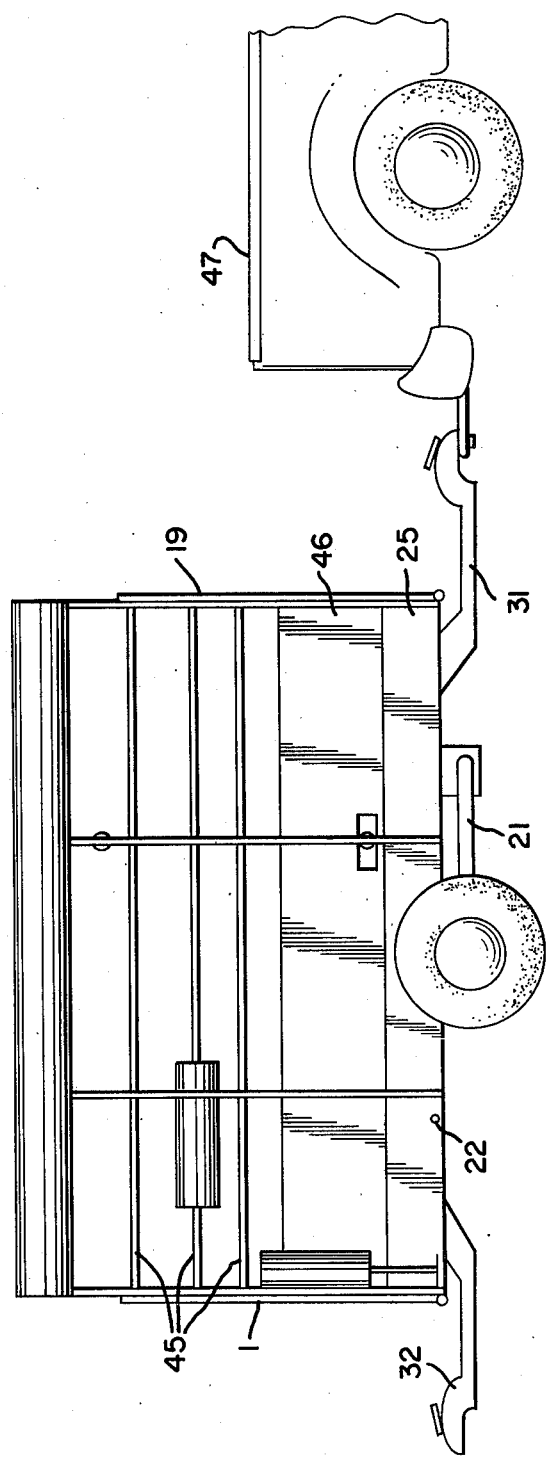
FIG. 5 is an elevation view of the unit as a towed vehicle.

The entrance gate 11 is normally open. As best seen in FIG. 2, a treadle 18 is pivotally arranged over a fulcrum 24 and is connected by hinges 30 to an entry ramp 1 and an exit ramp 19. Secured to the treadle 18 adjacent the entry ramp hinge 30 is a piston rod 48 which is connected to a piston 44 of a pump compressor 2. Upon stepping on the entry ramp 1, the animal's weight pushes the pump compressor piston 44 down, causing the normally biased closed piston valves 28 to be further urged against their seats by the pressure build-up in the lower chamber of the cylinder pump compressor 2. This same pressure build-up, both feeds the fluid into the pressure accumulator 7 and further compresses a specific volume of fluid in the upper portion of the pressure accumulator 7. While the idea of an accumulator that allows the unit to be able to store excess animal body weight in the form of pressure is not unique, the one described in this specification guarantees complete and sufficient spray for as many as four consecutive calves after one adult animal crosses the treadle. As the pump compressor piston 44 moves downward, the upper chamber of the cylinder pump compressor 2 fills with fluid by way of the cylinder pump compressor storage tank line 5 from the storage tank 4. When the animal moves off the treadle, the pump compressor piston 44 moves upward, further closing the upper valve 27 that prevents fluid from being forced back into the storage tank 4 while the piston valves 28 open and allow the lower chamber of the cylinder pump compressor 2 to fill with liquid readying the unit for another cycle. As the animal moves up the treadle 18, its shoulders intercept the rub bars 9, which are connected to the entrance gate 11 by a cable and compensating spring 39 so that the entrance gate 11 is urged to its closed position, even with the smallest of livestock pushing the rub bars 9. The entrance gate 11 closes after one animal passes into the unit to prevent the animal from being crowded by animals following. The reason for sequentially closing and opening the entrance gate 11 and exit gates 17 is to ensure an orderly and complete treatment of the livestock. As the rub bars 9 open, they activate a completely adjustable time-limited rub bar valve 10, that can be adjusted even during operation to assure that a complete and sufficient amount of fluid is dispensed on each animal through the two lower spray heads 14, and the two upper spray heads 15, the fluid being dispensed from the pressurized accumulator tank 7 by way of the accumulator rub bar valve line 8, the completely adjustable time-limited rub bar valve 10 and the rub bar valve-sprayer assembly line 12 to the sprayer assembly 13. The horizontal stabilizing bars 45 of the "V"-shaped passageway help ensure that the animal is properly positioned to be sprayed. As the animal passes the rub bars 9 with its rear quarters still in contact with the rub bars, the entrance gate 11 is caused to remain closed. At this point the animal begins to open the exit gate 17, thus pushing against the compliant spring 41 that simultaneously functions to maintain the exit gate 17 closed and the entrance gate 11 open. The compensating spring 39 is much stronger than the compliant spring 41, and as a result, while the rub bars 9 are open, the compensating spring 39 keeps the entrance gate 11 closed, even while the opening of the exit gate 17 puts a negative force on the compensating spring 39. When the animal has passed far enough into the exit gate 17 area, the rub bar 9 closes, enabling the weaker compliant spring 41 to take over and open the entrance gate 11 in order that another animal may enter. After the livestock's rear quarters pass the exit gate 17, it closes due to the force of the compliant spring 41. The eixt gate 17 closes after the animal passes through to prevent animals from attempting to re-enter the cattle sprayer after eating or drinking.

While this invention has been described with particular reference to the construction shown in the drawing and while various changes may be made in the detail construction, it shall be understood that such changes shall be within the spirit and scope of the present invention as defined by the appended claims.

Having thus completely and fully described the invention, what is now claimed as new and desired to be protected by Letters of Patent of the United States is:

1. Apparatus for spraying an animal with a fluid comprising:
   a frame including means defining a passageway for passge of an animal therethrough;
   means mounted on said frame for spraying fluid on the animal in said passageway, said spraying means including a reservoir containing a fluid to be sprayed, pump means having an inlet connected to said reservoir and an outlet and at least one spray nozzle connected to said outlet, said pump means having a first operative stroke for forcing fluid under pressure to said spray nozzle and a second operative stroke for withdrawing fluid from said reservoir;
   treadle means arranged in said passageway and defining a walkway for the animal;
   means pivotally mounting said treadle means about an axis intermediate the length of said treadle means for pivoting said treadle means in a first direction and then in a second direction opposite said first direction in response to the weight of the animal as it traverses said treadle means; and
   means operatively connecting said treadle means to said pump means for actuating the first operative stroke of said pump means in response to the pivoting of said treadle means in one of said first and second directions and for actuating the second operative stroke of said pump means in response to the pivoting of said treadle means in the other of said first and second directions.

2. Apparatus according to claim 1, including accumulator tank means connected to said pump means outlet for storing pressurized fluid generated by said pump means and valve means connected between said accumulator tank means and said spray nozzle for controlling the discharge of pressurized fluid from said accumulator tank means to said spray nozzle.

3. Apparatus according to claim 2, including rub bar means operable by the animal and connected to said valve means for shifting said valve means to an open position to permit discharge of pressurized fluid from said accumulator tank means to said spray nozzle.

4. Apparatus according to claim 1, wherein said passageway includes an entrance end and an exit end and further comprising gate means hingedly mounted at each of said entrance end and exit end for controlling ingress to and egress from said passageway and means arranged in said passageway and operable by the animal for selectively opening and closing the gate means at said entrance end and for selectively closing the gate means at said exit end whereby animals are admitted one-by-one into said passageway for spraying.

5. Apparatus according to claim 2, wherein said pump means comprises a cylinder mounted to said frame, a piston arranged to reciprocate in said cylinder and forming first and second chambers therein, said first chamber being connected to said reservoir, said second chamber being connected to said accumulator tank means, said means connecting said treadle means to said pump means including a piston rod connecting said piston with said treadle means, the pivoting of said treadle means in one of said first and second directions in response to the weight of the animal urging said piston and piston rod relatively of said cylinder to draw fluid from said reservoir into said first chamber and to force fluid under pressure from said second chamber into said accumulator tank means and the pivoting of said treadle means in the other of said first and second directions urging said piston and piston rod relatively of said cylinder to force fluid from said first chamber into said second chamber.

6. Apparatus according to claim 5, including resiliently biased check valves arranged between said first chamber and said reservoir and between said second chamber and said accumulator tank means to permit flow only in one direction therebetween and at least one resiliently biased check valve in said piston for permitting flow thereacross only from said first chamber to said second chamber.

7. Apparatus for spraying an animal with a fluid comprising:
   a frame including means defining a passageway for passage of an animal therethrough, said passageway having an entrance end and an exit end;
   means mounted on said frame for spraying fluid on the animal in said passageway;
   gate means hingedly mounted at each of said entrance end and exit ends for controlling ingress to and egress from said passageway; and
   means arranged in said passageway and operable by the animal for selectively opening and closing the gate means at said entrance end and for selectively closing the gate means at said exit end such that animals are admitted one-by-one into said passageway for spraying, said gate opening and closing means comprising a pivotable rub bar arranged in said passageway and movable from a first position to a second position in response to contact with the animal, a first resilient means connecting said rub bar to said entrance gate means for urging said entrance gate means closed and a second resilient means connecting said entrance gate means to said exit gate means for urging said entrance gate means open and said exit gate means closed, said first resilient means being arranged to oppose the force of said second resilient means such that, upon movement of said rub bar to said second position, said first resilient means urges said entrance gate means closed and after return of said rub bar to said first position, said second resilient means urges said entrance gate means open and said exit gate means closed.

8. Apparatus according to claim 7, wherein the spring constants and connecting points of said resilient means are selected such that the said first resilient means overcomes said second resilient means when said rub bar is moved to said second position and said second resilient means overcomes said first resilient means when said rub bar returns to said first position.

9. Apparatus according to claim 7, wherein said rub bar is operatively connected to said spraying means for actuating said spraying means when said rub bar is moved to said second position.

* * * * *